INVENTORS
JOACHIM v. ALBEDYLL
FRIDOLIN HENNIG

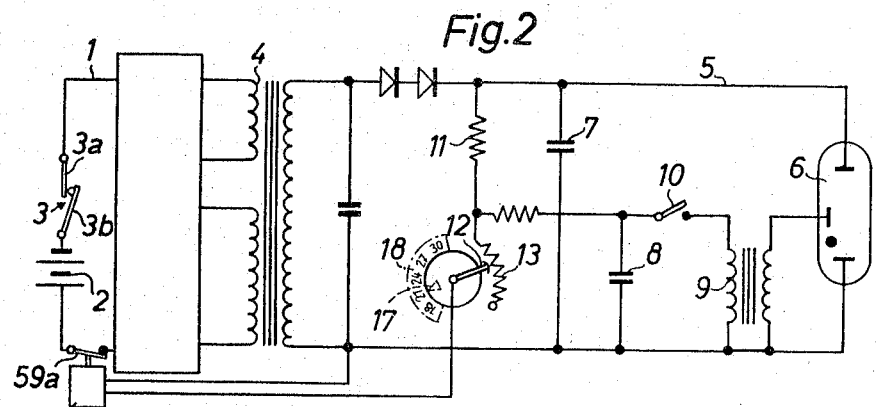
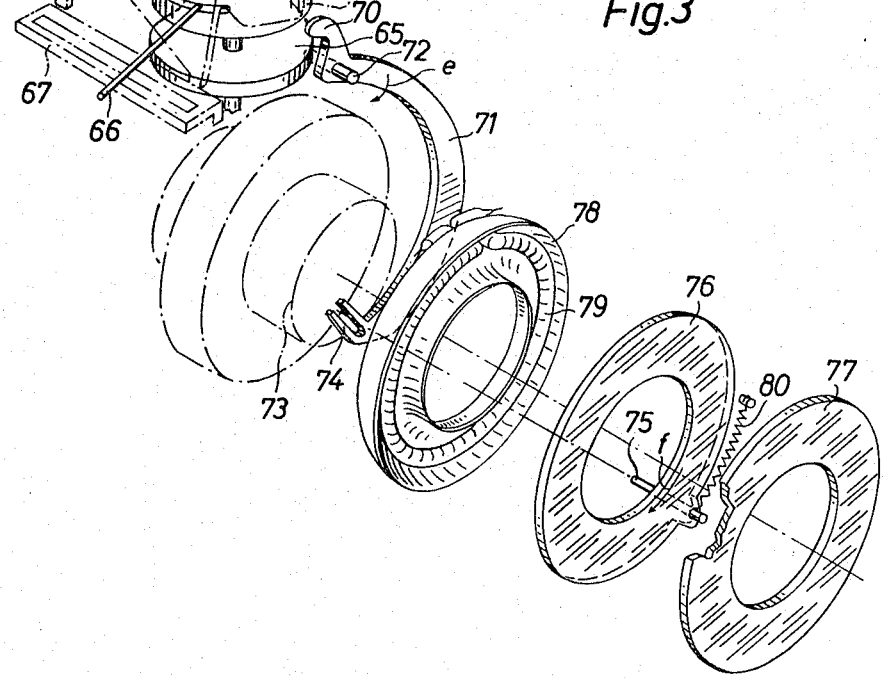

United States Patent Office  3,308,733
Patented Mar. 14, 1967

3,308,733
CAMERA ASSEMBLIES PARTICULARLY FOR MAKING EXPOSURES WITH ARTIFICIAL ILLUMINATION
Joachim von Albedyll and Fridolin Hennig, Munich, Germany, assignors to Agfa Aktiengesellschaft, Leverkusen, Germany
Filed July 27, 1964, Ser. No. 385,145
Claims priority, application Germany, July 26, 1963, A 43,690
10 Claims. (Cl. 95—10)

The present invention relates to photographic devices for making photographic exposures with artificial illumination.

In particular, the present invention relates to still and motion picture cameras which are provided with a built-in light measuring structure and which also are provided with either a built-in or detachable illuminating means for providing artificial illumination of a subject which is to be photographed.

A primary object of the present invention is to provide an exceedingly simple structure of the above type.

A further important object of the invention is to provide a structure of this type which does not require the operator to take special steps, as is required by conventional structures of this type, for the purpose of making exposures with artificial illumination.

In particular, it is an object of the invention to provide a structure of this type which will automatically determine the exposure apertures when the objective assembly of the device is focused according to the distance between the device and the subject to be photographed.

Furthermore, it is an object of the invention to provide a structure capable of automatically regulating the intensity of the artificial light when the light measuring structure is adjusted in accordance with the speed of the film which is exposed.

A further object of the present invention is to provide a structure which can electrically regulate the light intensity in a simple manner.

Also, it is an object of the invention to provide a structure that will mechanically regulate the light intensity also in an exceedingly simple manner.

Furthermore, it is an object of the present invention to provide a structure which will automatically energize an electrical circuit of the structure which provides artificial illumination whenever the device is set to provide exposures with artificial illumination, so that with the structure of the invention the operator cannot forget to connect a source of current, for example, to the artificial illuminating structure.

Furthermore it is an object of the invention to provide a structure which can be selectively set to provide exposures either with daylight or with artificial illumination, and wherein the device will automatically render the artificial illuminating structure ineffective when set for daylight exposures and the daylight exposure structure ineffective when set for artificial light exposures.

In addition, it is an object of the invention to provide a structure which is exceedingly compact and inexpensive while at the same time capable of accomplishing the above objects.

With the above objects in view, the invention includes, in a device for making photographic exposures with artificial illumination, an illuminating means for artificially illuminating the subject which is to be photographed, and a regulating means operatively connected with the illuminating means for regulating the intensity of the light provided thereby. The device includes a light measuring means and an adjusting means operatively connected thereto for adjusting the light measuring means according to the speed of the film which is in the device, and this adjusting means is also operatively connected with the above-mentioned regulating means for actuating the latter to regulate the light intensity according to the film speed. The device further includes an objective assembly which has a diaphragm adjusting means and a focusing means, the latter being adjustable for setting into the device the distance between the device and the subject to be photographed. A scale is carried by the objective assembly and cooperates with the diaphragm adjusting means for indicating to the operator settings thereof, and this scale has a range which is used for exposures with artificial illumination. When the diaphragm adjusting means is set to this latter range of the scale a coupling means of the objective assembly couples the focusing means to the diaphragm adjusting means for automatically providing for different distance settings different exposure apertures, respectively. Of course, instead of a diaphragm adjusting means it is possible to simply use a selecting means available to the operator for selecting daylight or artificial light exposures, and when set to provide exposures with artificial light the coupling means connects the focusing means to the diaphragm adjusting means for automatically determining the exposure aperture in accordance with the distance setting of the focusing means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a wiring diagram of the structure of FIG. 1 which provides artificial illumination of the subject to be photographed; and FIG. 3 is a perspective illustration of another possible structure according to the invention.

In order to fully appreciate the principles on which the invention is based, note should be taken of the following relationships:

(1) $$L = BE$$

(2) $$L_2 = \sqrt{2} \cdot L \cdot \sqrt{\frac{n}{3}}$$

In these equations L indicates the flash guide number, $L_2$ indicates the guide number which is to be found for use with film of a higher sensitivity (greater film speed) than the film used with the known guide number, B indicates the diaphragm setting, E indicates, in meters, the distance between the flash unit and the subject which is to be photographed, and $n$ indicates according to the DIN scale, the difference between the film speed of the more sensitive film and the film speed used with the known guide number.

According to Equation 2, if use is made of a film which is more sensitive by 6 DIN than the other film which is used with a known guide number, it is clear that the known guide number will be doubled when using the more sensitive film of greater film speed. If now, in order to provide in accordance with the invention a simple coupling between the diaphragm and distance setting structures, the Equation 1 provides for $B \times E$ a constant value, then it is clear that the guide number must also be constant. It follows, therefore, that when using a film whose speed is 6 DIN different from the other film, then the guide number must either be halved or doubled depending on whether the new film is more or less sensitive by 6 DIN than the film which is used with the known guide number. Therefore, in order to achieve this result the light intensity provided by the light source must be correspondingly changed.

Figure 1:
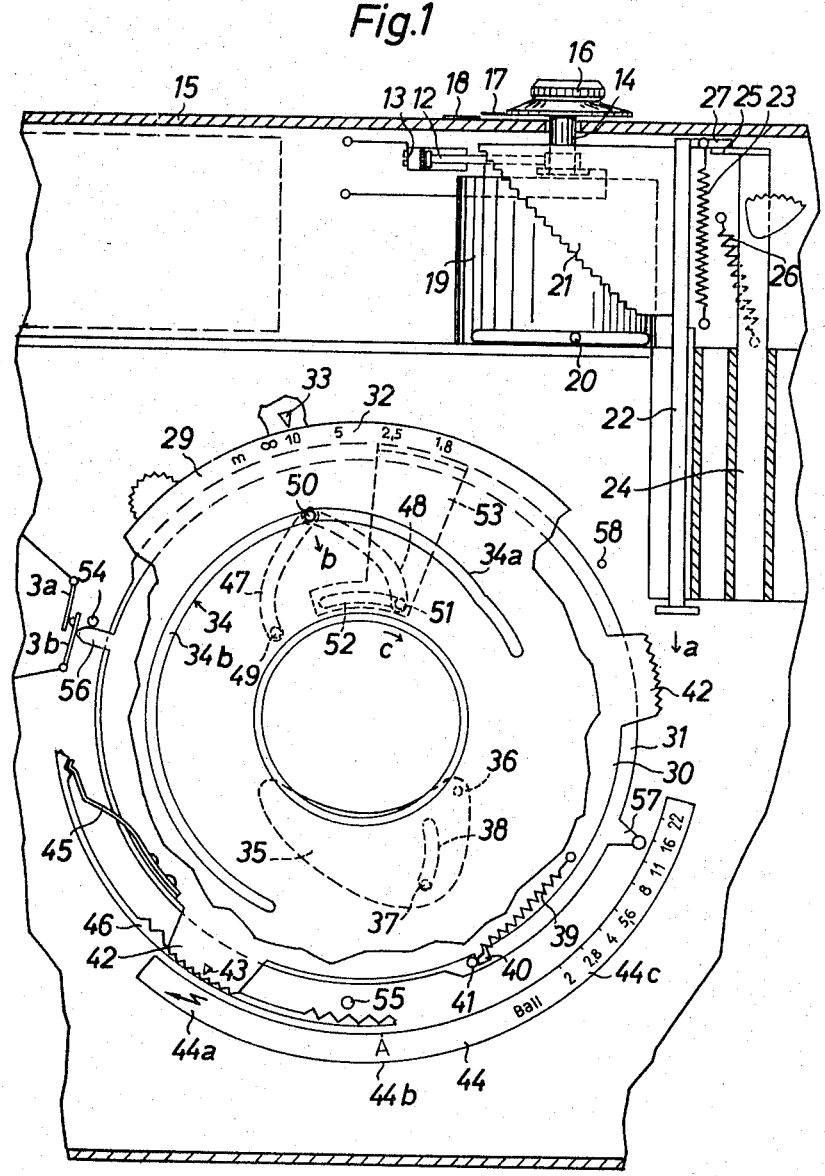
FIG. 1 is a fragmentary partly sectional and partly diagrammatic front elevation of one possible embodiment of a structure according to the invention.

According to the embodiment of the invention which is illustrated in FIGS. 1 and 2, the camera illustrated therein has a built-in electronic flash unit. This flash unit includes a current supplying circuit 1 which has a current source 2 (FIG. 2) which may be composed of one or more batteries or miniature storage batteries, and the circuit also includes an interrupter switch 3. The current supplying circuit 1 is connected electrically through a transformer 4 with a flash circuit 5. In this flash circuit 5 are the flash lamp 6, which is the light source, a flash capacitor 7, an ignition capacitor 8 and an ignition coil 9. Also, the flash circuit 5 includes a switch 10 actuated by the camera shutter so as to close the flash circuit and ignite the lamp in synchronism with the shutter in order to provide in a known way the artificial illumination at the instant when the shutter is open. The structure of the flash circuit 5, as thus far described, is in itself well known and does not form part of the present invention.

In order to regulate the light intensity of the light provided by the light source 6, there is connected in parallel with the flash capacitor 7 a fixed resistor 11 and a variable resistor 13 which includes a slider 12. The slider 12 is electrically connected with a switch controlling amplifier 59 which, when the capacitor 7 is charged to an extent determined by the adjustment of the variable resistor 13, automatically opens the switch 59 so as to open the current supplying circuit 1 and thus terminate the charging of the capacitor 7. With different extents of charge of the capacitor 7 the lamp 6 will provide different light intensities at the instant of ignition. Instead of a single capacitor 7, it is also possible to provide a plurality of capacitors of which only a preselected number required to be charged for producing a predetermined light intensity are charged.

Referring now to FIG. 1, it will be seen that the slider 12 of the variable resistor is fixed with a rotary shaft 14 which is in turn fixed at the exterior of the camera with a knob 16 capable of being turned with respect to the camera wall 15 for setting into the camera an adjustment for the speed of the film which is exposed therein. In the illustrated example the film speed adjusting structure 16 carries an index 17 movable along a stationary scale 18 carried by the wall 15 at the exterior of the camera, this scale 18 having film speed graduations with which the index 17 can be selectively aligned. The lower end of the shaft 14 is fixed with a moving coil type of instrument 19, such as a galvanometer, which is turnable in its entirety when the shaft 14 and knob 16 are turned, this instrument 19 forming a light measuring means which is operatively connected in a known, unillustrated manner with a photosensitive device on which the light (daylight) impinges for providing through its electrical connection with the light measuring means 19 an indication of the light intensity. A part 20 of the moving coil, such as a pointer of the instrument 19, for example, will thus assume an angular position determined by the lighting conditions, and of course this angular position will be influenced by adjustment of the knob 16 to take into consideration the film speed, as is per se well known. The position of the moving coil element 20 can be scanned by a known scanning device which can be used for automatically determining the extent to which the film is exposed.

In the illustrated example the scanning structure includes the scanning plate 21 which is fixed to a rod 22 guided for longitudinal movement but prevented from turning, this rod 22 being movable in the direction of the arrow a from the rest position illustrated in FIG. 1. The rod 22, and the scanning plate 21 therewith, are maintained in the rest position of FIG. 1 by a manually operable release means 24 also in the form of a rod guided for longitudinal movement. A projection 25 at the top end of the rod 24 extends beneath and engages a projection 27 at the top end of the rod 22, and a spring 23 urges the rod 22 in the direction of the arrow a while a stronger spring 26 urges the rod 24 to the illustrated rest position in opposition to the spring 23, so that in the rest position the spring 26 will maintain the parts as illustrated in FIG. 1 with the spring 23 tensioned by the stronger spring 26.

The structure further includes an objective assembly which has a focusing means 29 in the form of a manually turnable rotary ring, and the objective assembly also includes a pair of coaxial diaphragm supporting and adjusting rings 30, 31 which are coaxial with the rotary focusing means 29, and one of these diaphragm rings is coupled with the focusing means 29. Such a coupling is known per se and is shown, for example, in German Patent 1,121,458, so that the coupling between the focusing and diaphragm setting structures also does not form part of the present invention. Instead of this coupling another type of coupling can be provided. The focusing means 29 carries a scale 32 of distances which are in meters in the example shown in FIG. 1, and the graduations of the scale 32 are adapted to be selectively aligned with a stationary index 33. Furthermore, the focusing means 29 is formed with an arcuate control slot 34.

The diaphragm blades 35 are situated between the rings 30 and 31, and only one blade 35 is shown in FIG. 1 for the sake of clarity. Each blade is pivotally connected by a pin 36 to one of the rings and by the pin 37 and a slot 38 to the other of the rings so that when one of the rings turns relative to the other the diaphragm aperture will change. A spring 39 is fixed at one end to the ring 30 and at its opposite end to a pin 41 which is fixed to the ring 31, so as to urge the projection 40 of the ring 30 into engagement with the pin 41, and thus the spring 39 will determine the relative position between the rings 30 and 31 by maintaining the projection 40 of ring 30 yieldably in engagement with the pin 41 of the ring 31. The diaphragm ring 30 has a pair of finger pieces 42 which enables the ring 30 to be turned for the purpose of adjusting the diaphragm, so that these finger pieces 42 together with the ring 30 form a diaphragm adjusting means or, as will be apparent from the discussion below, a means for selecting a certain type of camera operation. The lower finger piece 42 of FIG. 1 carries an index 43 which cooperates with the scale 44 which has three ranges of adjustment 44a, 44b and 44c. The range 44a of the scale 44 is used when making exposures with artificial illumination, and for this purpose carries a symbol for flash illumination, while the range 44b is used for automatically determined exposures and for this purpose carries an appropriate symbol which will indicate to the operator the setting for automatic exposure control. The range 44c is provided for bulb exposures and includes a series of stop numbers as indicated in FIG. 1. In order to maintain the ring 30 in a selected position it fixedly carries a springy detent member 45 which cooperates with the detent teeth 46 which are stationary.

The rings 30 and 31 are connected to each other by a two-arm linkage 47, 48. The arm 47 of this linkage is pivotally connected to the ring 30 by a pivot pin 49 and the arms 47 and 48 are pivotally connected to each other by a pin 50 which also extends into the control slot 34 of the focusing means 29. The ring 31 fixedly carries a lug 53 which extends from the periphery of the ring 31 across the periphery of the ring 30 and in front of the latter, the inner end of the lug 53 being formed with an arcuate slot 52 extending along a circle whose center is in the optical axis and receiving the pin 51 which is located at the end of arm 48 distant from the pivot 50. The diaphragm ring 30 carries a projection 56 located between a pair of stationary stop pins 54 and 55 which thus limit the extent of turning of the ring 30. The projection 56 serves, when the diaphragm ring 30 is set by the operator to provide exposures with artificial illumination, to close the interrupter switch 3 of the current supplying circuit 1, this switch 3 including the stationary contact 3a and the contact spring 3b which when it is not engaged by the projection 56 automatically assumes a position spaced from the contact 3a so as to open the circuit 1. Thus, whenever the operator turns the ring 30 to the position shown in FIG. 1 where the index 43 is aligned with the range 44a of the scale 44, which is the position provided for exposures with artificial light, the circuit 1 will automatically be closed and the operator need not remember to connect the source of current to the structure for providing the artificial illumination. The turning of the ring 31 is limited in one direction by a stationary stop member 58 against which a projection 57 of the ring 31 moves for limiting counterclockwise turning of the ring 31, as viewed in FIG. 1.

When a new roll of film is placed in the camera, the knob 16 which forms the film speed adjusting means, is turned so as to align the index 17 with that graduation of the scale 18 which corresponds to the speed of the new film. This operation will on the one hand result in angular adjustment of the instrument 19 according to the film speed while on the other hand the variable resistor 13 is also adjusted according to the film speed.

In order to make exposures with artificial illumination, the operator turns the ring 30 by means of the finger pieces 42 to align the index 43 with the symbol of the range 44a of the scale 44 which indicates the proper position for exposures with artificial illumination, so that now the structure will have the position shown in FIG. 1. In this way the switch 3 is closed and thus the circuit 1 supplies current through the transformer 4 to the flash circuit 5. By way of the variable resistor 13 which is connected to the output of the transformer and which is in parallel with the capacitor 7, the maximum charge of the capacitor 7 is determined in accordance with the film speed adjustment.

Then the focusing means 29 is turned to set into the device the distance between the latter and the subject to be photographed, and for this purpose the operator aligns a selected graduation of the scale 32 with the index 33. As a result of this turning of the focusing means 29 the curvature of the portion 34a of the slot 34 will cam the pivot pin 50 in the direction of the arrow b. Inasmuch as the ring 30 is held by the detent means 45, 46 in the illustrated position the pin 49 cannot move and as a result the pin 51 is displaced in the direction of the arrow c so as to turn the ring 31 in opposition to the spring 39 also in the direction of the arrow c displacing the pin 41 away from the projection 40, and this movement of the ring 31 relative to the ring 30 will result in the turning of the blades 35 so as to adjust the exposure aperture. It is clear, therefore, that the linkage 47–51 forms a coupling means coupling the focusing means 29 to the diaphragm-adjusting means for automatically providing different apertures for different distance settings, respectively, and thus with the structure of the invention the operator need not be concerned with diaphragm settings since they will automatically be determined simply by adjusting the focusing means to the distance between the camera and the subject to be photographed. Once the focusing means is adjusted the exposure can be made.

If the operator aligns the index 43 with the range 44b or the range 44c of the scale 44, then the pin 50 is received in the portion 34b of the slot 34. While the portion 34a of the slot 34 curves inwardly toward the optical axis so as to cam the pin 50 in the direction of the arrow b during counterclockwise turning of the focusing means 29, as viewed in FIG. 1, portion 34b extends along a circle whose center is in the optical axis so that the counterclockwise turning of the pin 50 along the slot portion 34b will not result in any actuation of the linkage 47–51 and the diaphragm setting will not change. The same considerations apply when the focusing means 29 is turned relative to the pin 50 in a clockwise direction, from the position shown in FIG. 1, to displace the slot portion 34b relative to the pin 50. The rings 30 and 31 turn together until the projection 57 is situated directly beneath the rod 22. In other words when the index 43 is aligned with the symbol A at the range 44b of the scale 44, the projection 57 will be situated directly beneath the rod 22. Now when the plunger 24 is depressed by the operator in the direction of the arrow a the rod 22 will follow the movement of the rod 24 until the stepped scanning edge of the plate 21 engages the pointer 20, and during this downward movement of the rod 22 it will engage the projection 57 to advance the latter downwardly and thus provide a turning of the ring 31 in a clockwise direction relative to the ring 30 which is maintained stationary by the detent means 45, 46 so that in this way the structure will automatically determine the exposures aperture according to the intensity of the light which determines the angular position of the pointer 20.

In order to provide bulb or ball exposures, which is to say exposures where the operator manually maintains the shutter open, the pair of rings 30 and 31 are turned beyond the range 44b to the range 44c of the scale 44, and at this time the projection 57 will engage the stop 58 so that the continued turning of the ring 30 relative to the now stationary ring 31 serves to provide the manually determined exposures aperture according to the scale of stop numbers of the range 44c.

If the camera is to be provided with a detachable flash unit, the variable resistor 13 with its slider 12 are mounted in the camera and a plug-and-socket section is provided between the camera and the flash unit for connecting the flash unit electrically with the variable resistor and for connecting the flash unit electrically with the switch 10 which is also mounted in the camera to be actuated in synchronism with the shutter.

Figure 4:
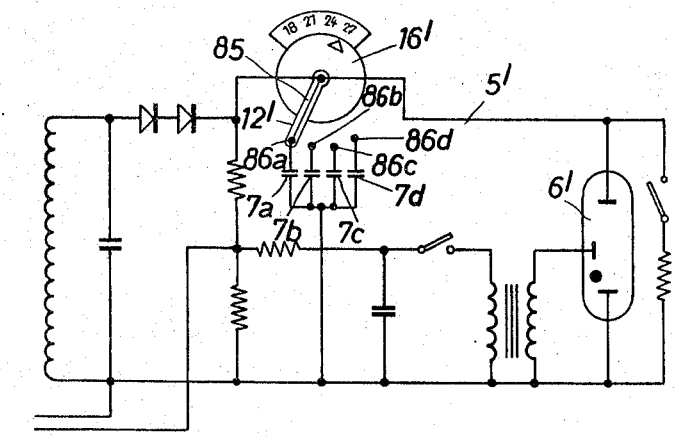
FIG. 4 illustrates a modification of the arrangement of FIG. 2.

The arrangement according to FIG. 4 is a modification of that illustrated by FIG. 2. The circuit is basically similar. However, the single flash capacitor 7 of FIG. 2 is replaced by a plurality of capacitors 7a, 7b, 7c and 7d each of which may be selected for being connected in the flash circuit 5'. For this purpose a film speed adjusting device 16' similar to the arrangement 12–18 of FIG. 2 is provided with a slide contact 12' carried by a rotatable arm 85 and connected thereby with line 5' so that depending upon the position of arm 85 any one of the contacts 86a–86d and thereby any one of said capacitors may be connected in the circuit. The capacitors 7a–7d have respectively differing capacities chosen to correspond to the different light outputs of tube 6' required to match different film speeds.

The embodiment of the invention which is illustrated in FIG. 3 includes an adjusting means 60 for making an adjustment according to the film speed, this adjusting means being in the form of a knob carrying an index 61 which is selectively aligned with the film speed graduations of the scale 62. The adjusting means 60 is connected by a shaft with the moving coil instrument 64 and with a cam 65. The moving coil of the instrument 64 is connected with a pointer 66 which can move freely over an anvil 67 located directly beneath the pointer 66, and the position of the pointer 66 can be scanned by a pivotally mounted scanning means 68. The scanning means is in a known and unillustrated manner connected with the structure for adjusting the exposure time and aperture so as to determine the extent of exposure automatically when the camera is set for providing automatically determined exposures.

The cam 65 is engaged by a cam follower portion 70 of a control lever 71 which is pivotally supported by a stationary pin 72 and which extends part of the way around the schematically illustrated objective assembly 73. The lower end of the lever 71 has a bifurcated portion 74 which receives a pin 75 of an annular polarizing filter 76 supported for rotation about the optical axis.

In front of the polarizing filter 76 is situated another annular, but stationary polarizing filter 77, and both of the polarizing filters are coaxially situated with respect to an annular reflector 78 which concentrically surrounds the objective 73 and which is situated immediately behind the polarizing filter 76. The artificial illuminating structure can be constructed to provide either individual flashes of light or continuous illumination. The pin 75 is also connected to one end of the spring 80 whose opposite end is fixed to a stationary member so that the spring 80 acts through the pin 75 on the lever 71 for maintaining the follower 70 in engagement with the camming periphery of the cam 65.

In order to make an adjustment in accordance with the speed of the film which is placed in the camera, the adjusting means 60 is manually turned until its index 61 is aligned with that graduation of the scale 62 which corresponds to the film speed. In this way the instrument 64 and the cam 65 are turned together with the knob 60. The turning of the instrument 64 will in a known way, assuming that the lighting conditions do not change, change the position of the pointer 66 with respect to the scanning means 63, so as to take into account the speed of the film. The turning of the cam 65 will be transmitted to the lever 71 so as to turn the latter in or opposite to the direction indicated by the arrow *e*. As a result the polarizing ring 76 will also turn about the optical axis in or opposite to the direction indicated by the arrow *f*. This turning of the filter 76 relative to the stationary filter 77 will control the density provided by the pair of filters 76 and 77, as is well known, and thus these filters form an adjustable light-blocking means capable of blocking the artificial light issuing from the light source to an extent determined by the film speed setting. The coupling between the diaphragm-adjusting means and the focusing means of the objective assembly 73 is identical with that described above in connection with FIG. 1. The light source 79 is also of an arcuate configuration and is situated within the reflector 78 as indicated in FIG. 3 directly behind the rotary polarizing filter 76. A photo sensitive means 69 in the form of a photo cell or photo sensitive resistor is electrically connected in a known way with the instrument 64 for determining the angular position of its moving coil and pointer 66 which is connected to the moving coil.

Also with this embodiment it is possible to provide a detachable artificial illuminating unit. In this case the structure is such that when the reflector is attached to the camera, as by a bayonet connection, an operative connection will be provided between the lever 71 which is permanently carried by the camera and the pin 75 which is received in the bifurcated portion 74 of the lever 71 when the detachable flash unit is attached to the camera.

The invention is not limited to the particular details described above and shown in the drawings. Thus instead of polarizing filters it is possible to use other light-blocking means such as, for example, an iris diaphragm or gray filters.

It will be understood that each of the elements described above, or two or more together, may also find a useful application in other types of cameras differing from the types described above.

While the invention has been illustrated and described as embodied in device for making exposures with artificial illumination, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a device for making photographic exposures with artificial illumination, in combination, illuminating means for artificially illuminating a subject which is to be photographed; regulating means operatively connected to said illuminating means for regulating the intensity of the light provided thereby; light measuring means for measuring light intensity; adjusting means operatively connected to said light measuring means for adjusting the latter according to the speed of the film which is exposed, said adjusting means being operatively connected to said regulating means for actuating the latter to regulate the light intensity provided by said illuminating means according to the film speed adjustment of said light measuring means; and an objective assembly including a focusing means for setting into the objective the distance between the subject and the device and also including a diaphragm adjusting means and a scale cooperating with said diaphragm adjusting means and having at least one range used when making exposures with artificial illumination, said objective assembly including a coupling means coupling said focusing means and diaphragm adjusting means to each other when said diaphragm adjusting means is at the range of said scale for providing exposures with artificial illumination for automatically providing predetermined apertures for different settings of said focusing means, respectively.

2. In a device as recited in claim 1, said illuminating means including an electrical light source and an electrical circuit connected thereto, and said regulating means being connected to said circuit for electrically regulating the light intensity according to the film speed adjustment of said light measuring means.

3. In a device as recited in claim 1, said illuminating means including a light source and said regulating means including an adjustable light blocking structure situated in front of said light source and operatively connected with said film speed adjustment of said light measuring means to be automatically adjusted thereby for covering said light source to an extent determined by the film speed adjustment of said light measuring means.

4. In a device as recited in claim 1, said regulating means including a pair of polarizing filters situated in front of said illuminating means with one of said filters located between said illuminating means and the other of said filters, and said film speed adjusting means being operatively connected to at least one of said polarizing filters for moving the latter with respect to the other of the polarizing filters for regulating the intensity of the light with which the subject is illuminated by said illuminating means.

5. In a device as recited in claim 4, said illuminating means including a light source and reflector of substantially annular configuration extending at least part of the way around the optical axis of the objective assembly and said polarizing filters also having each an annular configuration and at least one of said filters being turnable about the optical axis and operatively connected to said film speed adjusting means to be turned thereby to an angular position determined by the film speed adjustment.

6. In a device for making photographic exposures with artificial illumination, in combination, an electronic flash unit for providing artificial illumination; an electrical circuit connected to said flash unit and including at least one flash capacitor; regulating means operatively connected to said capacitor for regulating the extent to which the latter is charged so as to thereby regulate the intensity of light provided by said flash unit; light measuring means; adjusting means operatively connected to said light measuring means for adjusting the latter according to film speed, said adjusting means being operatively connected to said regulating means for also adjusting the latter according to film speed whereby the charge of said capacitor and thus the light intensity provided by said electronic flash unit will be controlled in accordance with the film speed adjustment of said light measuring means; and an objective assembly including a focusing means for setting into the device the distance between the device and the subject to be photographed, diaphragm adjusting means for adjusting the size of the exposure aperture, a scale cooperating with said diaphragm adjusting means and having a range used when making an exposure with artificial illumination, and coupling means coupling said focusing means to said diaphragm adjusting means for providing for different distance different exposure apertures, respectively, according to the distances set by said focusing means, when said diaphragm adjusting means is at said range of said scale provided for exposures with artificial illumination.

7. In a device for making photographic exposures with artificial illumination, in combination, electrical illuminating means for artificially illuminating a subject to be photographed; an electrcal circuit operatively connected with said illuminating means and including a flash capacitor and a variable resistor connected in parallel with said flash capacitor for regulating the charge thereof so as to regulate the intensity of the light given off by said illumintaing means; light measuring means; adjusting means operatively connected to said light measuring means for adjusting the latter according to the speed of the film which is exposed, said adjusting means being operatively connected to said variable resistor for also adjusting the latter according to the film speed, whereby said flash capacitor and thus the intensity of the light is regulated in accordance with the film speed; and an objective assembly including a focusing means for setting into the device the distance between the subject and the device and a diaphragm adjusting means for adjusting the size of the exposure aperture, said objective assembly including a scale having a range with which said diaphragm adjusting means cooperates when the device is set for making exposures with artificial illumination, and said objective assembly including a coupling means coupling said focusing means to said diaphragm adjusting means for respectively providing for different settings of said focusing means different exposure apertures when said diaphragm adjusting means is set to provide exposures with artificial illumination.

8. In a device for making photographic exposures with artificial illumination, in combination, electrical illuminating means for artificially illuminating a subject to be photographed; an electrical circuit connected to said illuminating means for supplying current thereto, said circuit including a switch for closing and opening said circuit; regulating means opertaively connected to said illuminating means for regulating the intensity of the light provided thereby; light measuring means; adjusting means opertaively connected to said light measuring means for adjusting the latter according to the speed of the film which is exposed, said adjusting means also being operatively connected to said regulating means for actuating the latter to determine the light intensity in accordance with the film speed; and an obejctive assembly including a focusing means for setting into the device the distance between the device and the subject to be photographed, diaphragm adjusting means for adjusting the exposure, aperture, a scale cooperating with said diaphragm adjusting means and having a range with which said diaphragm adjusting means is aligned when making exposures with artificial illumination, and coupling means coupling said focusing means to said diaphragm adjusting means for automatically providing in different settings of said focusing means different exposure apertures, respectively, when said adjusting means is aligned with said range of said scale, said diaphragm adjusting means automatically closing said switch when aligned with said range of said scale.

9. In a device for making photographic exposures with artificial illumination, in combination, illuminating means for artificially illuminatng a subject to be photographed; regulating means operatively connected to said illuminating means for regulating the light intensity provided thereby; light measuring means; setting means controlled by said light measuring means for setting the device to make exposures according to the light measured by said light measuring means; exposure determining means having a daylight exposure position located in the path of movement of said setting means to be actuated thereby for determining the exposure of film in the device and having an artificial light exposure position rendering said setting means ineffective for setting said exposure determining means; adjusting means operatively connected to said light measuring means for adjusting the latter according to the speed of film in the device, said adjusting means being operatively connected to said regulating means for adjusting the latter also according to the film speed so as to determine the light intensity provided by said illuminating means in accordance with the light intensity; and an objective assembly of which said exposure determining means forms a part, said obejctive assembly including a focusing means for setting into the device the distance between the device and the subject to be photographed and coupling means coupling said focusing means to said exposure determining means for automatically determining the size of an exposure aperture provided by said exposure determining means when the latter is set for artificial light exposures.

10. In a device as recited in claim 9, said illuminating means being electrical, and said device including an electrical circuit connected to said illuminating means and including a switch for closing and opening said circuit, said exposure determining means when set for providing exposures with artificial illumination automatically closing said switch.

References Cited by the Examiner

UNITED STATES PATENTS

| | | | |
|---|---|---|---|
| 1,866,581 | 7/1932 | Simjian. | |
| 2,145,914 | 2/1939 | Bartlek. | |
| 2,213,749 | 9/1940 | Strauss. | |
| 3,063,354 | 11/1962 | Matulik | 95—10 |
| 3,084,605 | 4/1963 | Kremp et al. | 95—10 |

NORTON ANSHER, Primary Examiner.

J. F. PETERS, Assistant Examiner.